D. CALDERONI.
PROCESS OF MANUFACTURING METAL TABLE UTENSILS.
APPLICATION FILED APR. 30, 1919. RENEWED AUG. 30, 1920.

1,371,469. Patented Mar. 15, 1921.

Inventor
D. Calderoni.
By H. R. Kerslake
Atty.

UNITED STATES PATENT OFFICE.

DOMENICO CALDERONI, OF MILAN, ITALY.

PROCESS OF MANUFACTURING METAL TABLE UTENSILS.

1,371,469.  Specification of Letters Patent.  Patented Mar. 15, 1921.

Application filed April 30, 1919, Serial No. 293,821. Renewed August 30, 1920. Serial No. 407,066.

*To all whom it may concern:*

Be it known that I, DOMENICO CALDERONI, a resident of Milan, Via Durini 15, Italy have invented certain new and useful Improvements in Processes of Manufacturing Metal Table Utensils, of which the following is a specification.

The present invention refers to improvements to a process for manufacturing metal table utensils.

The invention has for its object to provide a process of the above character wherein the production of table utensils, such as spoons, forks and knives, will be expedited, while the shaping and cutting of the same will be effected without wasting any material.

The process consists in subjecting a bar successively to the following operations, shaping, cutting, flattening, pressing.

The invention will be better understood with reference to the annexed drawing, which illustrates by way of example a method of carrying on the improved process.

The same numerals indicate like parts throughout the drawing.

Figure 1:
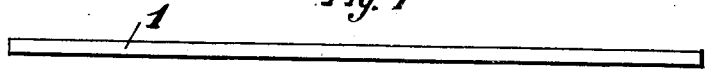
Figure 1 is the original bar.
Figure 2:
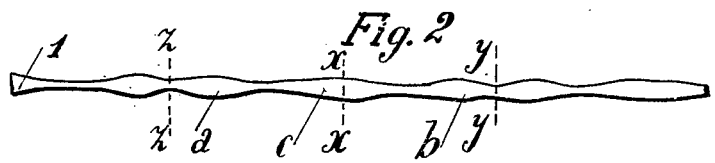
Fig. 2 represents that portion of the bar after it has been shaped.

Departing from a bar —1— the first step of the process consists in shaping the same throughout its length as shown in Fig. 2, said shaping resulting in sections —z—y— composed of the bulky portions, —a—b—c—, the middle bulky portion, —c— being of a length double the length of the end portions —a—b—. In other words two utensil blanks may be made from each section, the large or middle bulky portion representing two handles with the ends in proximity to each other, while the short or end bulky portions represent the engaging ends of the utensil and in the forming or shaping process each large or middle bulky portion, alternately arranged with respect to a pair of the small or end bulky portions.

Said operation may be effected by hammering the bar, after having heated the same more or less according to the nature of the the metal employed, or else the bar —1— may be passed between two rolling cylinders —2—3— provided with circular cavities —4—5— of which the developed form may be represented by Fig. 2.

These cylinders revolve in opposite directions (Fig. 2) and may be provided with a bearing gear for approaching them to one another.

The operation of cutting the shaped bar is effected after the shaped bar —1— is acted upon by the cylinders —2—3— between a cutter —7— and a plate —8—.

Each of the above described segments is cut away from the bar and divided in the middle.

Referring to Fig. 2 the bar is successively cut through lines —z—z—, —x—x—, —y—y— and so on.

Figure 3:
Fig. 3 shows a piece as cut away from said shaped bar.
Figure 4:
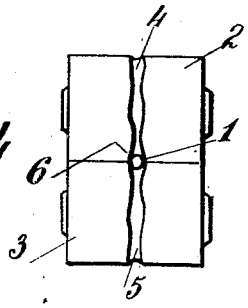
Fig. 4 is a diagrammatical view of shaping means for carrying on the process.
Figure 5:
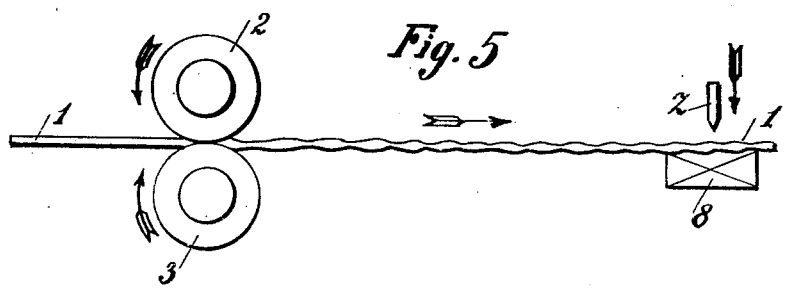
Fig. 5 is a side diagrammatical view of device for the execution of the process.
Figure 6:
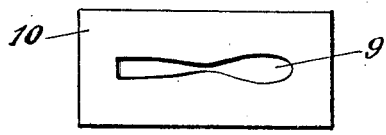
Fig. 6 is a die for pressing or both flattening and shaping the pieces 1.

The pieces (Fig. 3) in the third step, are pressed in suitable steel dies —10— having cavities —9— of the shape of the article, which in my illustrated case, will be a spoon.

Thereupon the utensil is subjected to the known finishing operation.

Having now particularly described the nature of my invention and the manner in which the same should be performed I claim:

A process for preparing fork, spoon and knife blanks, consisting in shaping a round bar throughout its length into a series of sections each of which comprises three bulky portions the middle bulky portion being approximately double the length of the end bulky portions of each section, and then cutting said bar at the ends and the middle of each section.

In testimony whereof I have affixed my signature, in presence of two witnesses.

DOMENICO CALDERONI.

Witnesses:
 G. G. GUARNSEY,
 IVAN LAVRETSKY.